United States Patent [19]

Rawn

[11] 3,989,268

[45] Nov. 2, 1976

[54] ANTI-JACK KNIFE SYSTEM FOR TRAILER TRUCKS

[75] Inventor: Kenneth Lyle Rawn, Willowdale, Canada

[73] Assignee: Lawrence Peska Associates, Inc., New York, N.Y. ; a part interest

[22] Filed: Apr. 7, 1975

[21] Appl. No.: 565,600

[52] U.S. Cl. .............................................. 280/432
[51] Int. Cl.² ...................................... B62D 53/10
[58] Field of Search ...................................... 280/432

[56] References Cited
UNITED STATES PATENTS

| | | | |
|---|---|---|---|
| 2,564,592 | 8/1951 | Bishop | 280/432 |
| 2,804,314 | 8/1957 | Billingsley | 280/432 |
| 3,250,547 | 5/1966 | Myers | 280/432 |
| 3,592,488 | 7/1971 | Holloway | 280/432 |

Primary Examiner—M. H. Wood, Jr.
Assistant Examiner—R. Schrecengost

[57] ABSTRACT

An anti-jack-knifing safety device for use on tractors and trailers operating on the highways and streets. It includes a gear rack mounted on the front end of the trailer, and secured against rotation thereon, and a second gear rack mounted on the rear end of the tractor, and also secured against rotation on the tractor. Electromagnetic solenoid means are provided on the tractor portion of the device, for moving the gear rack from retracted position to extended position and thus into intermeshment with the gear teeth on the front end of the trailer, thus blocking relative rotational movement of the trailer and tractor and thus blocking jacknifing. The solenoid is actuated from the tractor battery and through a foot switch controlled by the driver when jacknifing is imminent.

2 Claims, 3 Drawing Figures

TO BRAKE PEDAL

ANTI-JACK KNIFE SYSTEM FOR TRAILER TRUCKS

This invention relates to improvements in safety devices for use in construction and use of trailer-truck and other vehicles.

An object of the invention is to provide a novel and improved safety construction for trailer-truck and similar vehicles for safeguarding against jacknifing of such vehicles on the road.

Another object of the invention is to provide an antijackknife system and construction of commercial vehicles, in which the driver can guard against incipient tendency to jacknife by firmly engaging his tractor with his trailer, so that the trailer cannot pivot on the fifth wheel but must remain in alignment with the tractor during the period of the emergency situation.

A further object of the invention is to provide a system of gearing carried jointly on the rear of a tractor and on the front end of a trailer being towed, which is normally in unmeshed disengagement, so that the trailer is free to swing pivotally about the axis of the fifth wheel, during normal straight line highway travel, but with means for meshing the gearing when jacknifing is likely to occur, to prevent the free swinging of the trailer about the fifth wheel axis.

Still another object of the invention is to provide a novel and improved anti-jacknifing safety device, which can be installed on all types of tractor-trailer vehicles without need for radical reconstruction, and which can be made up from only a minimum of parts, and at low cost by mass production methods.

The above and other objects and advantages of the invention will become apparent from the following description of a preferred embodiment thereof, as illustrated in the accompanying drawings, forming a part hereof.

Figure 1:
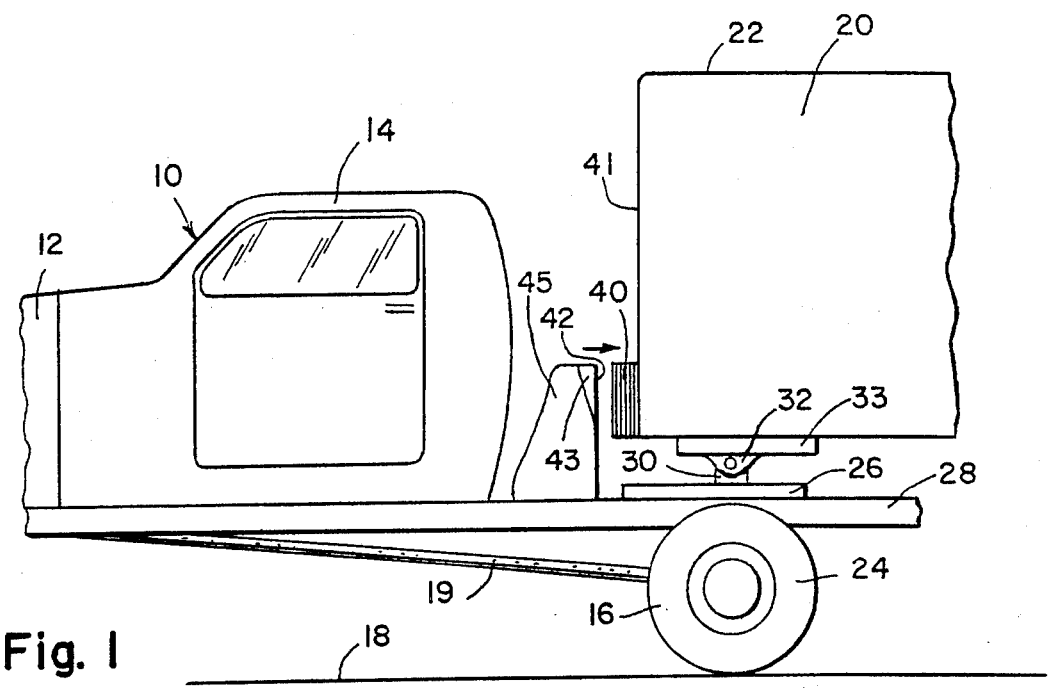
FIG. 1 is a fragmentary side elevational view of a tractor-trailer combination vehicle with the anti-jacknife device in un-engaged position.
Figure 2:
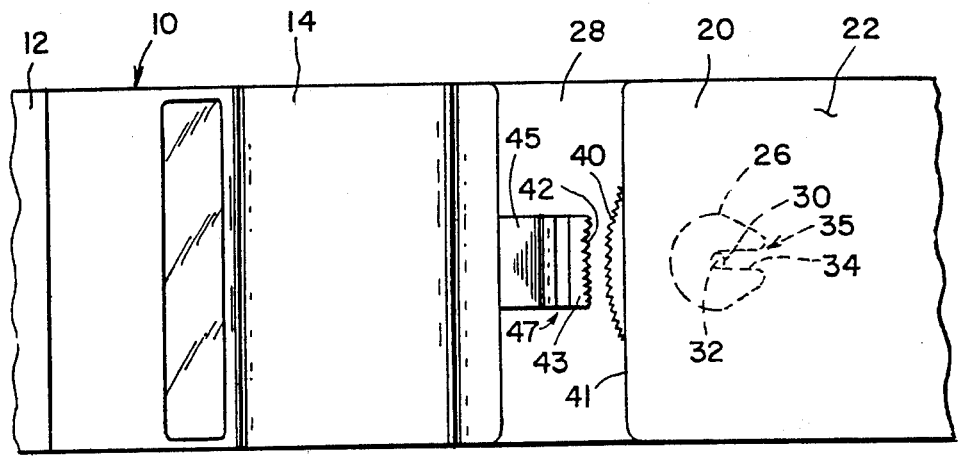
FIG. 2 is a top plan view of the combination vehicle of FIG. 1, with the anti-jacknife device in un-engaged position.
Figure 3:
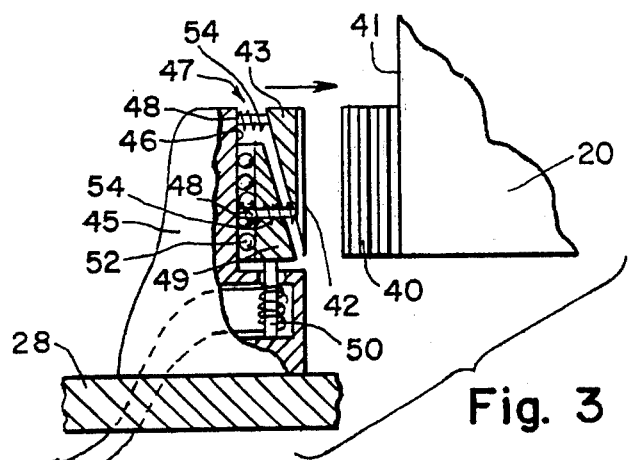
FIG. 3 is a fragmentary side elevational and sectional view of the tractor-trailer combination vehicles with the gearing in disengaged position and ready for engagement to avoid jacknifing.

In connection with the transportation of goods and merchandise on the highways, and through the streets of the cities, the use of ordinary small trucks has become financially unfeasible due to their small load carrying capacity. Accordingly, tractors have come into general use, for hooking up with trailers in which the merchandise is carried. While in the Eastern parts of the country, single trailers are mainly used, it has also become more common in midwestern and western parts of the country to couple more than one trailer to the single tractor, especially where there may be long runs of several hundred miles on wide open and little-traveled highways.

While the tractor-trailer combination vehicle is not likely to jacknife while riding along a straight highway, and without making sudden stops, it has frequently happened that it can occur when there are icy roads and skidding takes place. Further, when a driver is making a turn, either around a traffic circle, or into a side road, or on entering or leaving the cloverleaf pattern at an intersection of a super-highway, if he has to make a sudden stop, his trailer may jacknife and swing around at an angle to the tractor, causing an accident, overturning of the trailer or tractor, or other damage.

The term "Jack-knifing" comes mainly from the similarity to the common pocket knife, pen-knife or jack knife, in which the blade pivotally folds into or alongside the handle when not in use. In any event, this accident is to be avoided at all costs, and is one of the great fears of the drivers of tractor-trailers on the highways today. The present invention seeks to avoid this type of accident by rigidly securing the tractor and trailer together at the option of the driver when he feels that there is an imminent danger of jacknifing. This is done by gearing the tractor and trailer together by the driver, with gearing parts carried jointly on the trailer and tractor for use as needed.

In order to understand clearly the nature of the invention, and the best means for carrying it out, reference may be had to the drawings, in which like numerals denote similar parts throughout the several views.

As shown, there is a tractor 10, with its engine hood at 12, and driver's cab 14, and with its rear wheels 16 which ride on the road 18 and are driven by the drive shaft 19 connected by the engine under the hood. The trailer 20 is a long box-like affair which has plenty of interior space for the cargo in the nature of goods, merchandise, or even livestock, such as cattle, hogs, sheep, or the like. Where the cargo needs to be kept at a low temperature, such as meat, chickens or other poultry, or other perishable materials, the trailer may carry on top of its roof 22, a refrigeration compressor driven by a gasoline engine, for keeping the interior of the trailer cold.

The tractor may have only two rear traction wheels 24, where there is light loading, but may have four such rear wheels where there is heavy loading, in accordance with the rules and regulations governing load bearing wheels and their size on the highways, to avoid overloading, and also to minimize wear and tear on the roadways, bridges, cloverleafs and also the city streets. This is especially important for elevated highways, which recently have even collapsed due to excessive overloading and wear and tear, and also resulted in formation of potholes.

For engagement with the trailer which is being towed, the tractor has a "fifth wheel" portion 26, on its rear deck 28, which has a socket 30 for engagement with the downwardly extending pivot pin 32 with its hub or disc portion 33, which is guided by guide side edges 34 on the rearwardly open slot 35 of the fifth wheel of the tractor. For effecting such engagement of the trailer with the tractor, the trailer is lifted on its jacks sufficiently to allow the fifth wheel of the tractor to reach under the front end of the trailer, and thus to engage therewith, the jacks being then lowered and swung out of the way beneath the trailer.

In order to block jacknifing, I provide a toothed gear rack 40 secured to the front end 41 of the trailer by rivets, brackets, or other means, the gear rack being arcuate, for engagement of its teeth with the matching teeth 42 on the concave arcuate toothed rack 43 which is carried on the tractor. The gear racks 40 and 43 are normally carried in spaced relationship, and have no effect on possible jacknifing. However, when the driver suspects imminent jacknifing, he steps on his brake pedal or pedal next to it, and causes the gear rack 43 to move toward and into meshed engagement with the gear rack 40 on the trailer, thus blocking rotation of the trailer about the axis of the fifth wheel and hence blocking jacknifing.

To accomplish this, I provide a main base member 45 secured to the rear deck 28 of the tractor, with an upstanding rear wall 46, with a wedge shaped space 47 between it and the sloping rear wall of the gear rack 43. Pins or rods 48 extend out of the wall 46 and into holes in the gear rack 43, so that the rack can be moved away from the wall 46, by means of the upward movement of the wedge plunger 49 which is in the wedge spaced space 47, and moveable upwardly by means of a solenoid 50 connected to the car battery through a foot or dashboard switch in the cab which the driver can close to elevate the wedge plunger 49 and thus move the gear rack 43 into meshing engagement with the trailer gear rack 40.

Anti-friction ball-bearings 52 are interposed between the left side of the wedge plunger 49 and the wall 46, and tension springs 54 may be used to aid in retraction of the wedge plunger when not needed.

Although the invention has been described in specific terms, it is understood that various changes may be made in size, shape, materials and arrangement without departing from the spirit and scope of the invention as claimed. It is also understood that where more than one trailer is hooked up to the tractor, then the anti-jacknifing arrangement will also be applied to the front of the rearmost trailer and the rear of the intermediate trailer.

Having herein described the invention, what is claimed as new is:

1. An anti-jack-knifing safety device for use on tractor-trailer combination vehicles in which there is a tractor and at least one trailer coupled to the tractor for being towed thereby, said safety device comprising first main safety device body means constructed and arranged for being carried by said tractor, second main safety device trailer coupling means constructed and arranged for being carried by said trailer, and moving coupling means carried by said first main safety device body means and constructed and arranged for being brought into operation by the driver operator of said vehicle for blocking said tractor and trailer against jack-knifing relative movement relative to each other, said second main safety device trailer coupling means comprising a second rack body means, a plurality of second gear teeth carried by and projecting outwardly from said second rack body means, and wherein said first main safety device body means comprises a first rack body means, a plurality of first gear teeth carried by and projecting outwardly from said first rack body means, said first and second gear teeth being constructed and arranged for mutual intermeshment together when brought into contact engagement with each other, and gear rack anchoring means for blocking angular rotation of said gear rack body means relative to respective related the tractor and trailer on which they are mounted, said gear rack anchoring means comprising a second gear rack anchor secured fixedly to an end of said trailer for blocking rotation of said second gear rack relative to its said supporting trailer, and wherein said gear rack anchoring means comprises a first gear rack anchor body means secured fixedly to a rear portion of said tractor, said first rack body means being moveable from retracted position out of engagement with said second gear teeth, to extended intermeshed position in toothed engagement with said second gear teeth, so as to block rotational movement of said trailer relative to said tractor and thus avoiding jack-knifing, and wedge means disposed intermediate said first gear rack anchor body means and said first rack body means, and moving means for moving said wedge means from retracted position to extended position for moving said first rack body means and its said teeth into meshed engagement with said second gear teeth on said trailer, and for blocking axial jack-knifing rotation thereof.

2. The construction of claim 1, wherein said moving means comprises a solenoid connected to a battery in said vehicle, switch means for actuating said solenoid, and plunger means in said solenoid for moving said wedge means to move said first gear rack means into intermeshed engagement with said second gear rack teeth to block jack-knifing rotation of said tractor-trailer elements.

* * * * *